United States Patent [19]

Davis

[11] Patent Number: 4,627,140

[45] Date of Patent: Dec. 9, 1986

[54] ANCHOR BOLT SETTING IMPACT TOOL

[75] Inventor: Maurice J. Davis, Hicksville, N.Y.

[73] Assignee: Drillco Devices Limited, Long Island City, N.Y.

[21] Appl. No.: 718,418

[22] Filed: Apr. 1, 1985

[51] Int. Cl.⁴ .................. B23P 19/04; B25B 27/14
[52] U.S. Cl. .................................. 29/264; 29/275
[58] Field of Search ............... 29/258, 264, 275, 254, 29/255; 72/114

[56] References Cited

U.S. PATENT DOCUMENTS

| | | | |
|---|---|---|---|
| 2,562,419 | 7/1951 | Ferris | 29/264 |
| 3,082,578 | 3/1963 | Lindstaedt et al. | 29/275 |
| 3,139,730 | 7/1964 | Williams et al. | |
| 3,166,210 | 1/1965 | Nelson | 29/264 |
| 3,462,988 | 8/1969 | Tudor et al. | 29/264 |
| 3,472,052 | 10/1969 | Chance | 29/264 |
| 4,165,946 | 8/1979 | Andersson | |

Primary Examiner—Robert C. Watson
Attorney, Agent, or Firm—Dowell & Dowell

[57] ABSTRACT

A tool for positioning a tapered anchor bolt assembly with its part initially oriented in a hole in a concrete wall which has been undercut to provide a conical hole portion, and for setting the anchor bolt by rigidly holding its cone properly positioned opposite the conical portion of the hole while impact-driving its sleeve inwardly of the hole to expand it over the anchor cone and fill the conical undercut portion of the hole to set the anchor therein, the tool having mutually interfering parts which limit the distance that the sleeve can be driven inwardly with respect to the cone so as to limit the driving effect of impact applied to the tool.

11 Claims, 6 Drawing Figures

FIG. 3.
FIG. 4.
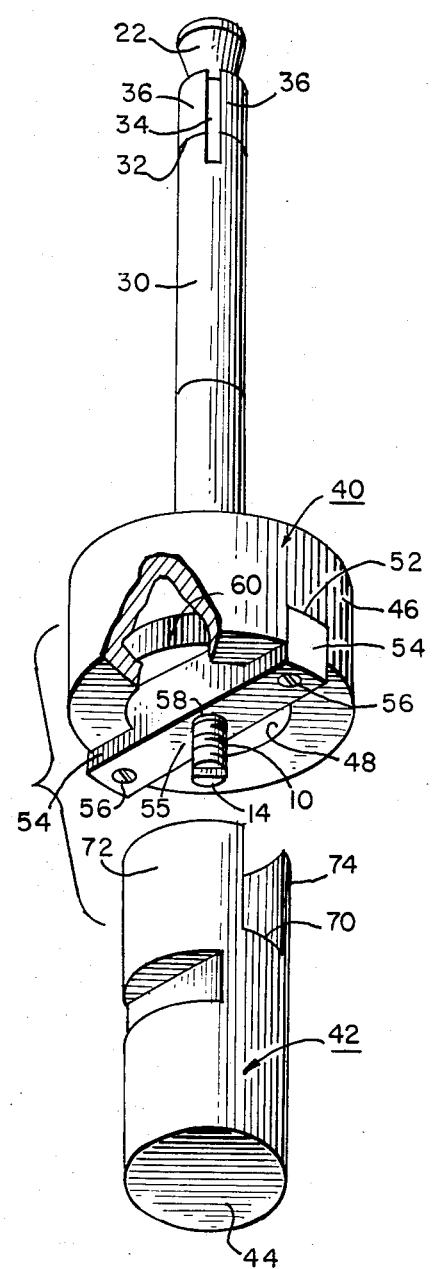
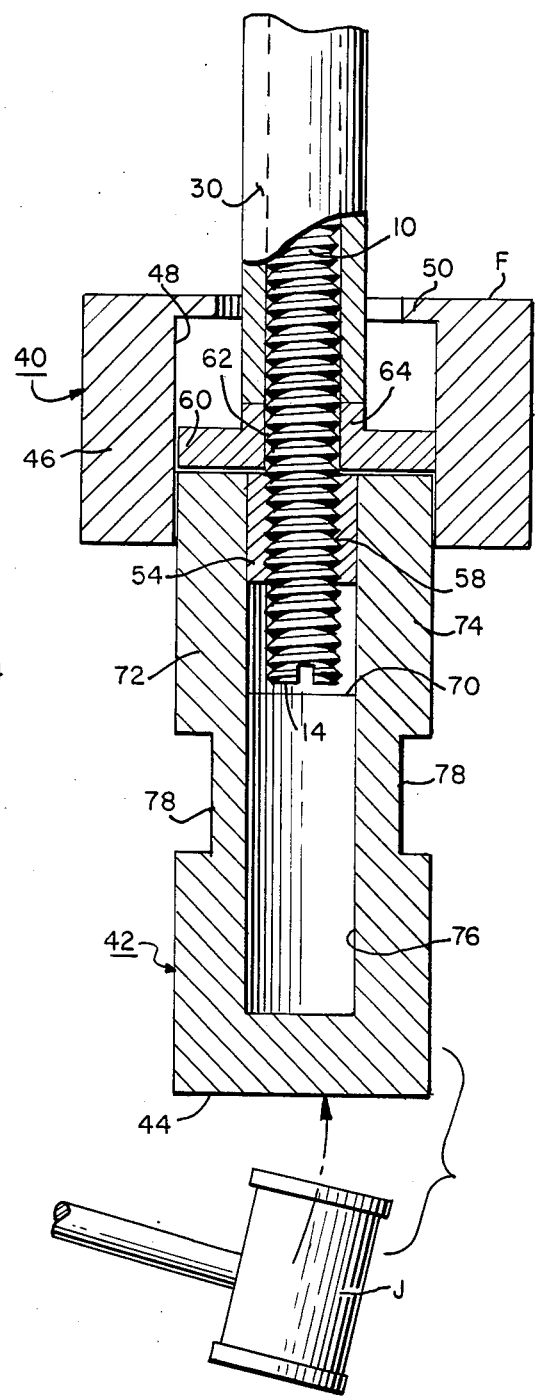

ANCHOR BOLT SETTING IMPACT TOOL

BACKGROUND AND PRIOR ART

This invention relates to a method and tool for setting a tapered anchor bolt in a hole drilled and conically undercut in a wall, especially a concrete wall, by properly positioning the stud bolt of the anchor assembly and causing its sleeve to expand into the conical undercut when the tool is subjected to impact, for instance by a hammer.

Tapered anchor bolts have long been secured in holes in masonry and other structures. In most instances the bolts are set either by screwing up a nut on a stud bolt so as to pull a cone into a sleeve surrounding the stud as shown in U.S. Pat. No. 4,339,217 to Patrick J. Lacey et al or, in some instances, by using impact to expand the sleeve over the cone as shown for example in U.S. Pat. No. 3,139,730 to Williams et al, FIG. 13, wherein the stud and cone are bottomed on the blind end of a hole and the sleeve is driven over the cone by a cylindrical member struck by a hammer. The approach used in U.S. Pat. No. 4,165,946 to Andersson likewise bottoms the stud and cone in a blind bore and drives an expansion sleeve over the cone using a gun. In the case of both the Williams and the Andersson patents, the blind bore is necessary to prevent the cone from retreating further into the hole as the sleeve is driven onto it. Both holes shown in these patents have to have an end wall to axially locate the stud in the hole.

None of the known prior art patents includes the concept of providing a threaded stud bolt to which a cone is attached, positioning the bolt and cone in the drilled hole and rigidly supporting the cone in its final set position, while using impact to expand the sleeve by driving it over the cone.

THE INVENTION

The invention comprises a multi-component tool having a holder member including a body which contacts the wall of the structure into which an undercut hole extends. The body of the holder member has a bore extending therethrough which aligns with the hole in the wall and has a crosspiece and threaded means to receive the threaded stud bolt of the anchor assembly. Inside the bore of the tool body there is located a bushing which is captivated within the holder member by said crosspiece at one end of the bore and by an annular shoulder of the body located at the other end of the bore where the holder member contacts the wall. The tool further includes an impact-driver member which is bifurcated to provide two legs which straddle the crosspiece of the holder member and extend into its bore to contact the bushing. The anchor bolt assembly, typically of the type shown in the aforementioned Lacey U.S. Pat. No. 4,339,217, has a stud bolt carrying a cone at its far end which extends into the hole in the wall, and has a slotted sleeve which surrounds the stud and is intended to be expanded over the cone. The axial length of the sleeve is the same as the length of the cylindrical portion of the hole between the surface of the wall and the beginning of the conical undercut in the hole plus the length of the cone. In use, the threaded end of the stud is inserted into the bore of the holder member, past the shoulder and through the bushing, and is screwed into the threaded means at the crosspiece hand-tight until the sleeve of the anchor bolt assembly just bottoms against the bushing at one end and against the smaller end of the cone at the other end. Then the impact-driver member is introduced into the bore against the bushing with its legs straddling the crosspiece. A hammer or other impact device is used to strike the end of the driver member remote from the holder member. Since the face of the holder member is flat against the wall, and since the stud is threadedly supported at the crosspiece, the stud and cone are rigidly positioned in the hole with the cone located exactly opposite the conical undercut portion of the hole and the sleeve contacting the small end of the cone and extending outside the hole by a distance equal to the axial length of the cone. Moreover, the bushing located in the bore of the body is spaced from the shoulder by the same distance. Therefore, using the present tool and performing the present method, when the driver member is impacted, the bushing can move toward the cone only until it bottoms on the shoulder, at which time the sleeve has been driven over the cone, but not beyond its larger end. The method and tool can also be used to set an assembly in a cylindrical hole which is not undercut.

OBJECTS AND ADVANTAGES OF THE INVENTION

It is a principal object of the invention to provide an impact method and tool for holding, positioning and setting an expanding anchor bolt assembly in a precision undercut bore in a structure, such as a wall, whereby the parts of the anchor assembly will be precisely positioned both before and after setting with respect to the conical undercut portion of the shaped hole in the wall. Such precise setting is realised by properly dimenioning the excursion of the tool under impact, the relatively moving parts of the anchor assembly, and the axial location of the undercut within the hole in the wall to achieve mutually cooperative positioning and setting fuctions.

It is a very important object of the invention to provide an impact method and tool for precision setting anchor bolt assemblies in holes in walls so that the setting can be achieved more quickly and easily than can be done by torque-wrench tightening of the anchor bolt assembly to set it.

A major object of the invention is to provide an impact method and tool for setting anchor bolt assemblies in holes in walls wherein the setting is done with greater precision and uniformity, from assembly to assembly, than is achieved by torque-wrench tightening as has been done in the past.

Still another object of the invention is to provide an impact method and tool for setting an anchor bolt assembly in an undercut hole in a wall, while preventing over-stressing of the bolt assembly and/or cracking of the concrete around the hole. Using the present method and impact tool, it is not possible to improperly displace the cone and expand the sleeve anywhere except within the undercut portion of the hole.

Another object of the invention is to provide a method and tool for positioning and setting an anchor bolt assembly either in a hole which extends beyond the conical undercut, or else in a hole which ends at the conical undercut. This is not true in the case of screw-type torque-setting of an anchor assembly because the cone must extend beyond the undercut as shown in FIG. 1 of the above Lacey patent prior to pulling it back into the sleeve, and therefore the hole must not end at the undercut. Moreover, although it is desirable to have the hole extend beyond the undercut to receive the cuttings while it is being undercut, the present method and tool do not require it, thereby making the present invention more versatile in it use.

A further object of the invention is to provide an impact tool of the type described above wherein the impact member of the tool has wrench flats on it and is bifurcated so that it straddles the crosspiece of the holder member, whereby, after the bolt assembly is set, a wrench can be used to assist the workman in starting to unscrew the tool from the assembly, initial unscrewing of the tool sometimes being difficult.

Another object of the invention is to provide a tool having a floating bushing within its holder portion, the latter being so constructed as to retain the bushing therein at all times during normal use to prevent loss of parts of the tool.

Still another object of the invention is to provide a tool wherein the floating bushing has a limited excursion within the bore of the holder member, whereby to prevent driving of the sleeve too far over the cone. The bushing also has a boss in its inner end which, at the end of the excursion, extends slightly into the hole so that the sleeve is driven into the hole a small increment beyond the surface of the wall. As a result, when the bolt is tightened using a nut on the stud, the sleeve itself is never placed in axial compression in the hole between the nut and the cone.

It is a principal object of the invention to provide a method of positioning and setting an anchor assembly in a hole having an undercut portion remote from the surface of the wall into which the hole extends, the method including the steps of assembling the sleeve around the stud with one end adjacent to the cone, the sleeve being equal in length to the cylindrical portion of the hole plus the axial length of the cone, inserting the sleeve and stud and cone into the hole, rigidly supporting the stud from outside the hole while maintaining contact with the wall surface adjacent to the hole to axially position the cone opposite the undercut portion of the hole, the other end of the sleeve protruding from the hole by a distance equal to the axial length of the cone, and impact-driving said other end of the sleeve inwardly of the hole flush with or slightly inside the wall surface to drive said one end of the sleeve over the cone through an increment which does not substantially exceed the axial length of the cone.

BRIEF DESCRIPTION OF THE DRAWINGS

FIG. 3 is a perspective view, partly exploded, showing an anchor bolt assembly supported by a tool according to this invention prior to insertion of the bolt in a hole in a wall;

FIG. 4 is a partial view in cross section showing the tool supporting the outer end of an anchor bolt assembly and ready for impact-setting thereof;

DESCRIPTION OF PREFERRED EMBODIMENT

Figure 1:
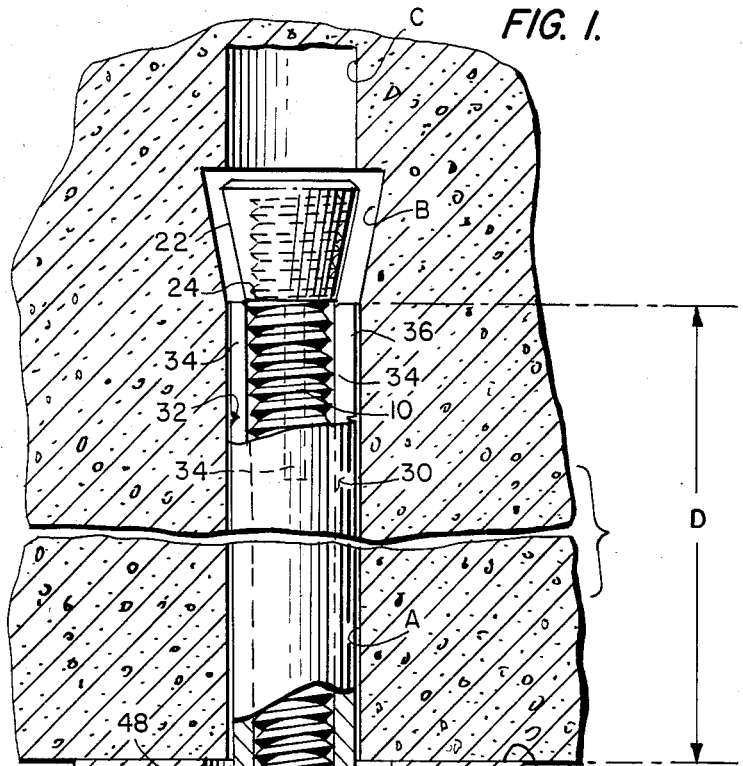
FIG. 1 is a cross sectional view of a wall having an undercut hole therein, and showing an anchor bolt assembly supported and positioned in the hole prior to setting the anchor assembly, by a tool according to the present invention.

FIG. 1 shows a hole which has been preformed in a concrete wall W. The hole has an elongated cylindrical protion A extending inwardly from the surface of the wall and joining a conically flared undercut hole portion B which enlarges away from the surface of the wall and joins an inner cylindrical portion C of the hole which can be either blind or can pass all the way through the wall. The conically flared portion of the hole B is spaced from the surface of the wall by a very accurately determined distance D, and can be undercut in the hole using a tool as shown in Lacey U.S. Pat. No. 4,307,636.

Figure 5:
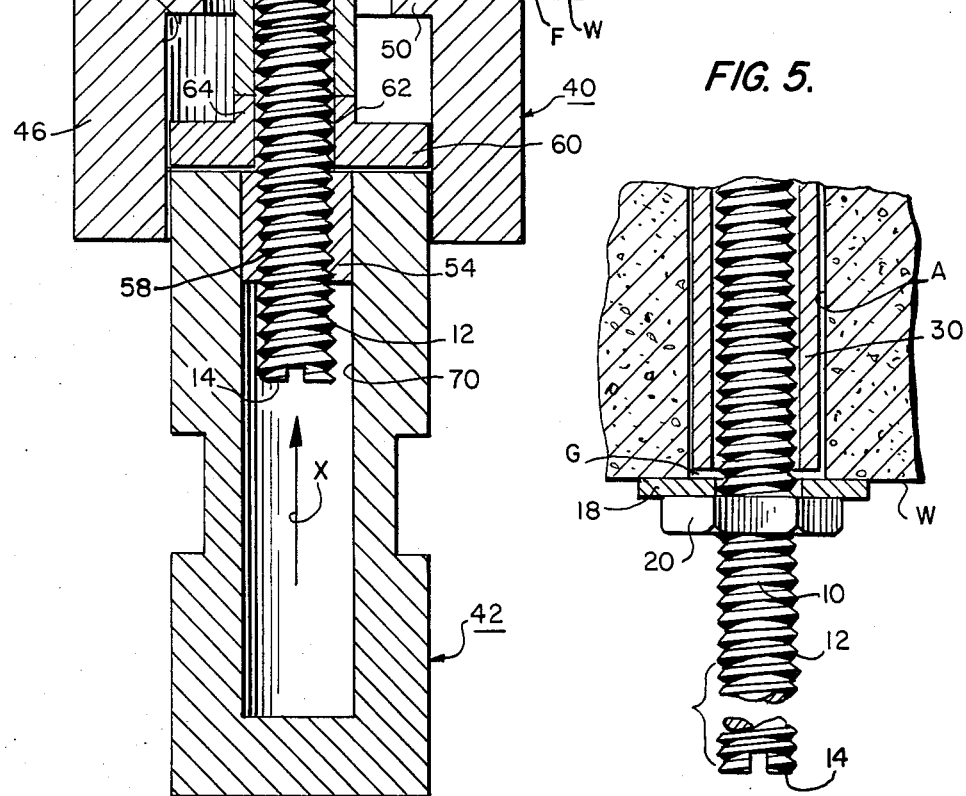
FIG. 5 is a partial view in cross section showing the anchor bolt assembly tightened in the hole by a nut and washer.
Figure 2:
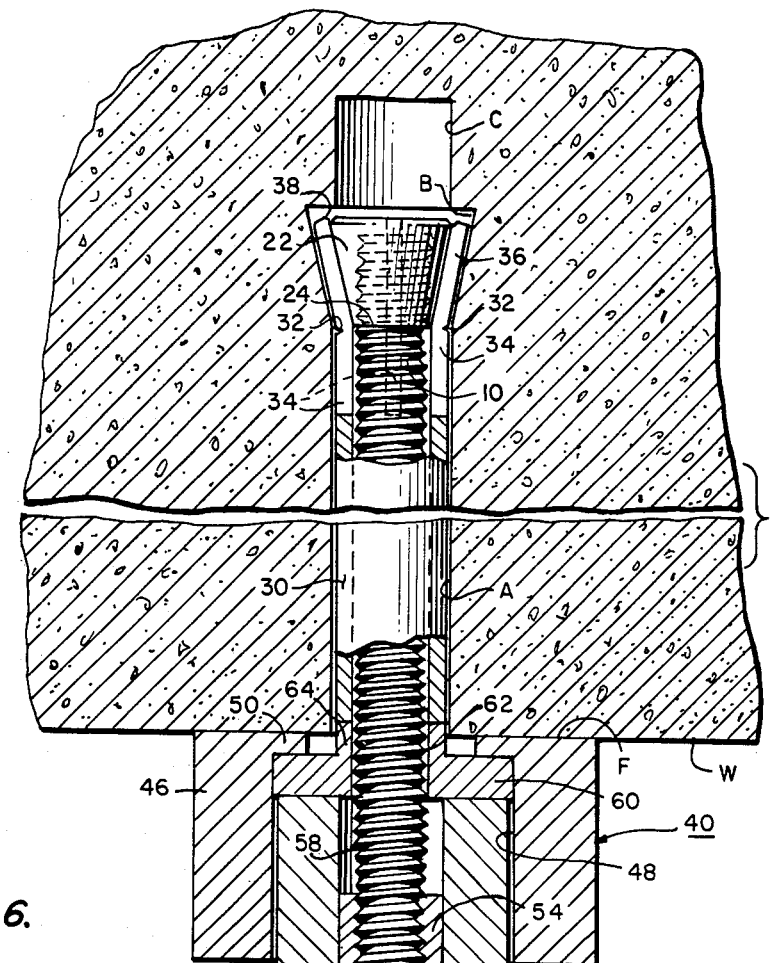
FIG. 2 is a view similar to FIG. 1, but showing the positions of the anchor bolt assembly and the tool after the assembly has been set.

The drawings also show a typical anchor bolt assembly for insertion into the hole, for instance as shown in Lacey U.S. Pat. No. 4,339,217. The anchor assembly includes a stud bolt 10 which is threaded as at 12 and has an outer end 14 having a screw driver slot in it to prevent rotation of the stud while a threaded member such as a nut 20, FIG. 5, is being attached or removed, the assembly usually including a washer 18 under the nut. The stud bolt carries a cone 22 having about a 10° taper located at the innermost end of the bolt, which cone can either be integral with the bolt or threaded or otherwise fixed onto the bolt. The stud bolt is surrounded by a metal sleeve 30 which has an annularly spaced series of longitudinal slots 34 extending parallel to the axis X of the assembly from the inner end of the sleeve outwardly to a point beyond the axial length of the cone to thereby divide the sleeve into leg portions 36 as shown. Three or four such longitudinal slots 34 are usually used, and the leg portions can be provided with an annular V-cut 32 therein to make the legs spread more easily when driven onto the cone. The free ends of the legs 36 are chamfered as at 38 where they initially rest on the small end 24 of the cone 22. The over-all length of the sleeve is about equal to the distance D along the cylindrical portion A of the hole plus the axial length of the cone 22.

The features thus far described are conventional in the art and describe a standard anchor assembly which is usually set by placing it in the hole with the outer end of the sleeve 30 flush with the wall surface, and then screwing the nut 20 onto the threads 12 to pull the cone back into the sleeve 30 to expand its leg portions, as described in the aforementioned Lacey U.S. Pat. No. 4,339,217.

The present invention, however, employs a different method of positioning and setting the anchor assembly wherein the sleeve 30 is driven over the cone 22 which is held stationary in the hole opposite the undercut portion B thereof, using a special tool for achieving initial positioning of the anchor assembly and setting thereof.

FIGS. 1 through 4 show the impact tool, which comprises a holder member 40 for holding the stud bolt 10, and a drive member 42 which cooperates with it to set the assembly when the end 44 of the impact member 42 is struck, for instance by a hammer J. As can be seen in FIGS. 3 and 4, the holder member comprises a cylindrical body 46 having an internal bore 48 therein. One end of the bore 48 is narrowed by a shoulder 50 which is located adjacent to the transverse face F of the body, while the other end of the bore extends through the body. The body is recessed at 52, FIG. 3, on both sides of the bore 48 to receive a crosspiece 54 which is held in place on the body by two screws 56. The center of the crosspiece 54 is drilled to receive the stud bolt 10 and is preferably tapped as at 58 in axial alignment with the bore 48 to provide threaded means to rigidly support the outer end of the stud bolt 10 as shown in FIGS. 1 though 4, although alternatively the threaded means might comprise a nut (not shown) which would be screwed onto the stud bolt 10 and abut the crosspiece outer surface 55, FIG. 3.

Inside the bore 48 of the body there is located a bushing 60 which is of such outside diameter as to freely slide in the bore 48 but not to pass out of it past the shoulder 50. The bushing 60 is therefore permanently retained in the bore 48 by the shoulder 50 and by the crosspiece 54. The bushing has a bore 62 through it which just passes the stud bolt 10, and has a downwardly depending annular boss 64 of lesser outside diameter which contacts the outer end of the sleeve and which can extend past the shoulder 50 when the bushing is driven by impact. In the preferred embodiment, the axial length of the boss 64 is slightly greater than the axial length of the shoulder 50 so that the bushing will drive the outer end of the sleeve 30 slightly beyond the outer surface of the wall W. This is shown in FIG. 5 wherein a small increment or gap G appears between the outer end of the sleeve 30 and the washer 18. As a result, when a nut 20 is tightened, for instance to support a bracket (not shown) against the wall on the stud bolt 10, even if the sleeve and bolt should be drawn slightly outwardly of the hole, the sleeve will still not be placed in axial compression between the washer 18 and the cone 22.

Figure 6:
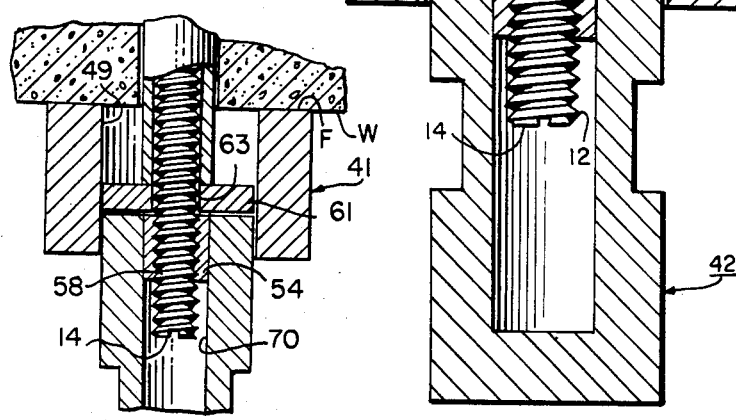
FIG. 6 is a fragmentary view similar to FIG. 1, but showing a modification.

As an alternative, the bushing 60 carrying the annular boss 64 can be replaced by a washer 61 carrying no boss, as shown in FIG. 6. In this modification, the cylindrical body 46 will also be modified by omission of the shoulder 50, thereby providing a cylindrical body 41 having a continuous bore 49 therethrough. The washer 61 will have a central hole 63 which closely passes the stud bolt 10 so that the washer will bear against the outer end of the sleeve 30, but the outer diameter of the washer will be anywhere between a diameter slightly larger than the sleeve 30 and a diameter slightly smaller than the diameter of the bore 49. When the tool shown in FIG. 6 is used, the end of the sleeve 30 will be set just flush with the outer surface of the wall W, leaving no gap corresponding with the gap G shown in FIG. 5.

The impact-drive member 42 is of such diameter as to snuggly fit into the bore 48 of the body 46 and has a deep slot 70 extending thereinto, the slot being of such width as to pass the crosspiece 54 when the driver member 42 is inserted into the bore 48 into contact with the bushing with its two legs 72 and 74 straddling the cross piece 54, FIG. 3. The driver member 42 has a central bore 76 that extends into the member toward its impact end 44. In addition, the driver member is provided with opposed wrench flats 78 for the reason hereinafter discussed.

The operation of the tool is described as follows. With reference to FIG. 3, it will be seen that the tool is first brought into axial alignment with an anchor bolt assembly having a sleeve 30 mounted on its stud bolt 10. The stud bolt is then screwed into the threaded means at the crosspiece 54 until the bushing bottoms lightly against the outer end of the sleeve with the inner end of the sleeve abutting the cone 22 at the chamfers 38. The bolt assembly is then inserted into the hole of the wall W as shown in FIG. 1, until the transverse face F of the body 46 bottoms against the surface of the wall. At this time, the anchor bolt cone 22 will lie just opposite the undercut conical portion B of the hole, and the sleeve will still be touching the small end of the cone 24 at its chamfer 38 as well as the boss 64 of the bushing 60 at its outer end. The driver member 42 is then inserted into the bore 48 with its legs 72 and 74 straddling the crosspiece 54 and with its bore 76 receiving the outer end 14 of the stud bolt 10, as shown in FIG. 4. The operator then proceeds to impact the end 44 of the driver member 42 with the hammer J until he has driven the bushing 60 into contact with the surface of the shoulder 50, at which time the parts of the tool and anchor assembly will occupy the positions shown in FIG. 2. If the annular boss 64 of the bushing 60 is longer in the axial direction than the axial thickness of the shoulder, the sleeve will be driven slightly beyond the surface of the wall, leaving it in the position shown in FIG. 5, although it is also contemplated that the length of the boss 64 may be made equal to the thickness of the shoulder 50 so that the outer end of the sleeve will just lie flush with the wall surface. Different uses of the invention may make different gaps G desirable, or no gap at all. When the bushing 60 has contacted the shoulder 50, no further movement of the sleeve into the hole is possible, and further impact will not damage the anchor assembly or the concrete in the vicinity of the hole. The wrench flats 78 are used to start the tool unscrewing from the stud bolt until it is loose enough to unscrew by hand.

This invention is not to be limited to the exact form shown in the drawings, for obviously changes may be made within the scope of the following claims.

I claim:

1. An impact tool for positioning and setting an anchor bolt assembly in a hole extending inwardly through the wall surface of a structure, the anchor asssembly being of the type including a stud bolt having a threaded outer end extending from the wall and an inner end carrying the smaller end of a cone which enlarges away from said surface and the assembly further including a sleeve surrounding the bolt and operative to have its inner end expanded by the cone when the sleeve is axially moved over it, the tool comprising:

(a) a holder member having a bore therethrough to receive the outer end of the bolt and the sleeve and having means to rigidly support the threaded outer end of the bolt, and having at one end of said bore a transverse face oriented normal to the axis of the bolt to abut the surface of the wall and position the cone a fixed distance inside the hole;

(b) a driver member which is an element separate from said holder member and which is insertable into the bore of the holder member in axial alignment with the outer end of the sleeve and operative to be impact-driven in the direction of said cone to drive the sleeve further into the wall so that its inner end is expanded over the rigidly positioned cone; and (c) said means to rigidly support the outer end of the bolt to position the cone at a fixed distance inside the hole comprising complementarily threaded means in said holder member to receive and engage the threaded end of the stud bolt.

2. An impact tool as claimed in claim 1, wherein said means to rigidly support the outer end of the bolt comprises a crosspiece extending across the holder member at the other end of the bore from said transverse face and having an opening therethrough to receive the outer end of said stud in threaded engagement therewith, the driver member having a bifurcated end presenting two legs spaced apart to straddle the crosspiece and extend into the bore of the holder member toward the outer end of the sleeve.

3. An impact tool as claimed in claim 2, further including a washer located inside the bore of the holder member and having a hole therethrough closely passing the stud bolt so that the washer contacts the sleeve at its outer end, the washer being disposed to lie between the crosspiece and the sleeve, the axial spacing in the bore between the shoulder and the washer being substantially equal to the axial length of the cone when the bolt is screwed into the crosspiece until the sleeve bottoms between the washer and the smaller end of the cone.

4. An impact tool as claimed in claim 2, further including a bushing located inside the bore of the holder member and disposed to lie between the crosspiece and the sleeve, the holder member having an annular shoulder formed at said one end of said bore forming said transverse face and operative to retain the bushing in the bore, the axial spacing in the bore between the shoulder and the bushing being substantially equal to the axial length of the cone when the bolt is screwed into the crosspiece until the sleeve bottoms between the bushing and the smaller end of the cone.

5. An impact tool as claimed in claim 4, wherein the bushing includes a central annular boss contacting the outer end of the sleeve and being small enough in diameter to pass beyond the shoulder, the axial length of the boss being greater than the axial thickness of the shoulder, whereby the sleeve is driven into the wall beyond its surface until the bushing touches the shoulder when the driver member is impact-driven.

6. An impact tool as claimed in claim 2, wherein the driver member further includes wrench receiving means on a portion thereof extending outside said bore, whereby the driver member can be gripped and rotated in a direction to turn the holder member and its crosspiece to unscrew the latter from the bolt.

7. An impact tool for positioning and setting an anchor bolt assembly in a hole extending inwardly through the wall surface of a structure, the hole including an outer cylindrical portion having a conical undercut portion located at a fixed distance into the hole from the wall surface, and the anchor assembly being of the type including a stud bolt having a threaded outer end extending from the wall and an inner end carrying the smaller end of a cone which enlarges away from said outer end and the assembly further including a sleeve surrounding the bolt and of axial length equal to the axial length of the outer cylindrical portion of the hole plus the axial length of said cone and the sleeve being expansible at its inner end to overlie the cone when the sleeve is axially moved over it, the tool comprising:

(a) a holder member having a bore therethrough to receive the outer ends of the bolt and the sleeve, the member having a threaded crosspiece fixed to the holder member across the bore and operative to receive and rigidly support the threaded outer end of the bolt, and the member having a transverse face disposed normal to the axis of the bolt and spaced from the crosspiece;

(b) the axial spacing of the crosspiece with respect to the transverse face being such that when the anchor assembly is inserted into the hole with the transverse face of the holder member against the surface of the wall and with the bolt screwed into the crosspiece until the sleeve bottoms between the crosspiece and the smaller end of the cone, the outer end of the sleeve will protrude from the wall by a distance substantially equal to the axial length of the cone; and (c) a driver member insertable into the bore axially aligned with the sleeve and operative when impact-driven in the direction of said cone to drive the sleeve further into the wall so that its inner end is expanded over the rigidly positioned cone.

8. An impact tool as claimed in claim 7, wherein the driver member has a bifurcated end presenting two legs spaced apart to straddle the crosspiece and extend into the bore toward the outer end of the sleeve.

9. An impact tool as claimed in claim 8, wherein the driver member further includes wrench receiving means on a portion thereof extending outside said bore, whereby the driver member can be gripped and rotated in a direction to turn the holder member and its crosspiece to unscrew the latter from the bolt.

10. An impact tool as claimed in claim 7, further including a bushing located inside the bore of the holder member and disposed to lie between the crosspiece and the sleeve, and the holder member having an annular shoulder in the bore adjacent to said transverse face and operative to retain the bushing in the bore, the axial spacing in the bore between the shoulder and the bushing being substantially equal to the axial length of the cone when the bolt is screwed into the crosspiece until the sleeve bottoms between the bushing and the smaller end of the cone.

11. An impact tool as claimed in claim 10, wherein the bushing includes a central annular boss contacting the outer end of the sleeve and small enough in diameter to pass beyond the shoulder, the axial length of the boss being greater than the axial thickness of the shoulder, whereby the sleeve is driven into the wall beyond its surface until the bushing touches the shoulder when the driver member is impact-driven.

* * * * *